Jan. 17, 1939.  H. W. EDEN  2,144,404
MANOMETER
Filed March 15, 1937  2 Sheets-Sheet 2
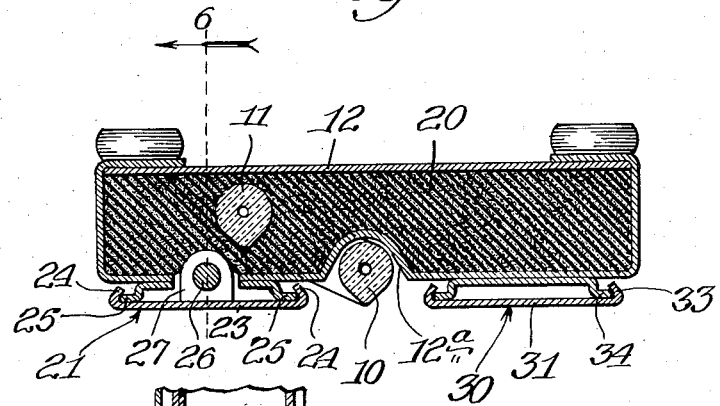
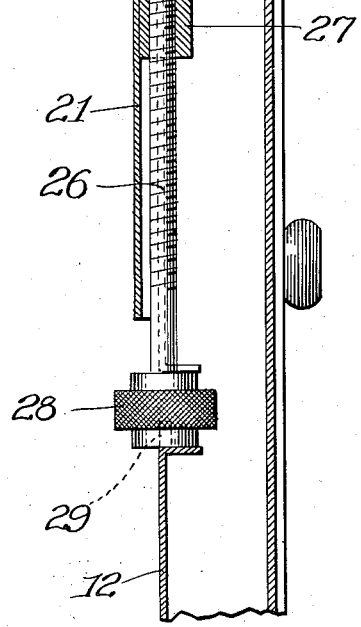
Inventor:
Harold W. Eden,
By Dyrenforth, Lee, Chritton and Wiles,
Attys.

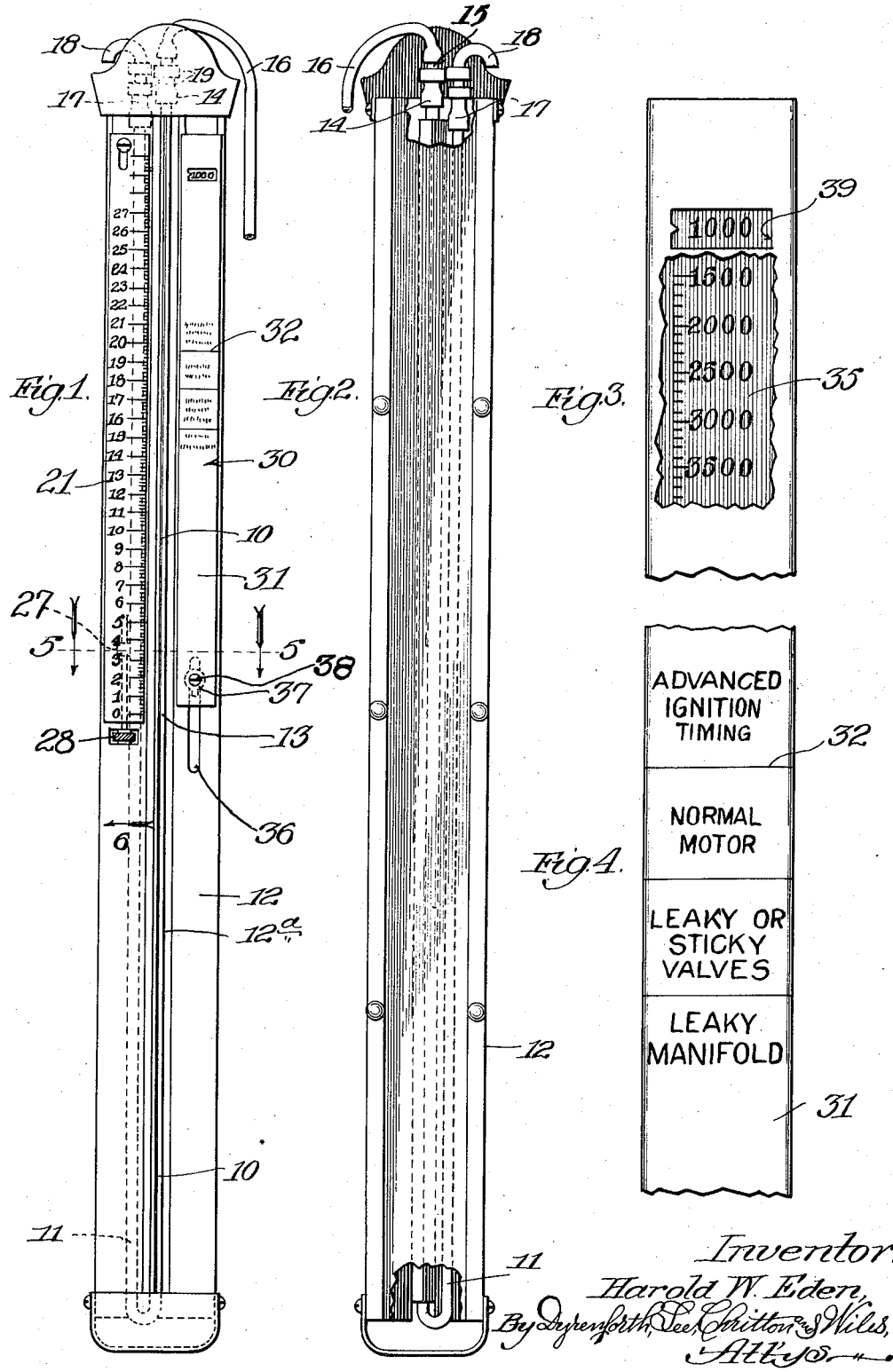

Patented Jan. 17, 1939

2,144,404

UNITED STATES PATENT OFFICE 2,144,404

MANOMETER

Harold W. Eden, Chicago, Ill., assignor to Triple-A Specialty Company, a corporation of Illinois Application March 15, 1937, Serial No. 131,079

2 Claims. (Cl. 73—31)

This invention relates to a manometer for an internal combustion engine and more particularly to measuring scales for indicating the condition of said engine.

One feature of this invention is that it provides means for measuring accurately the vacuum developed in the intake manifold of an internal combustion engine; another feature of this invention is that it enables the operator to read the vacuum developed in inches of mercury directly from a scale without subsequent correction for changes in temperature; still another feature of the invention is that it enables the operator to determine the condition of a motor directly from a scale without subsequent correction for changes in altitude; other features and advantages will appear from the more detailed description given in connection with the drawings, in which—

Fig. 1 is a front elevation of the device; Fig. 2 is a rear elevation, partly broken away; Fig. 3 is an enlarged view of a portion of the motor condition scale, broken away to show the altitude scale on the stand therebeneath; Fig. 4 is an enlarged view of a portion of the motor condition scale; Fig. 5 is a sectional view along the line 5—5 of Fig. 1; and Fig. 6 is a sectional view along the line 6—6 of Fig. 1.

While manometers to test the vacuum and thus determine the condition of internal combustion motors have been known and used for some time they have been open to various objections. The chief objection is that the measuring scales are immovable. Variations in physical conditions cause inaccuracies in scale readings. For instance, the mercury expands and contracts with changes in temperature. Hence, the level of the mercury column does not correspond to zero on the inch scale, and when a reading is taken on this scale it must be subsequently corrected for temperature changes. In the case of the motor condition scale variations because of temperature changes being small may be disregarded, but after the reading is taken correction must be made for changes in altitude since the vacuum developed by the motor is the difference between atmospheric pressure and the pressure inside the motor. When the altitude changes, the atmospheric pressure, the vacuum developed by the motor, and the manometer reading change accordingly. It has been the practice to calibrate the scale at an arbitrarily chosen altitude, generally at sea level, and then correct the reading from a chart prepared for this purpose.

In the invention disclosed herein the inch scale for measuring the vacuum may be adjusted so that zero on the scale corresponds with the level of the mercury in the manometer. The motor condition scale may be adjusted to a setting corresponding to changes of vacuum with altitude. In this fashion the operator is enabled to take accurate readings directly from the scales and avoid subsequent corrections from charts.

Referring more particularly to the drawings of the embodiment of this invention disclosed herein, a manometer is shown with an open end glass U-tube having an exposed leg 10, the other leg 11 being enclosed by the supporting stand 12. The exposed leg of said U-tube preferably is recessed in a groove 12ª in said stand 12, so that the projections on either side of said leg, whether they be measuring scales or the stand itself, extend beyond the edge thereof. Said U-tube is filled with any convenient liquid, here shown as mercury, to a level 13 sufficiently high to allow the manometer to register a vacuum of 30 inches of mercury. The exposed leg 10 of the U-tube is connected by rubber tubing 14 to an outlet tube 15 which in turn is connected by rubber tubing 16 to the intake line of an internal combustion engine, not here shown since it forms no part of the present invention. The other leg 11 of the U-tube is connected by rubber tubing 17 to an outlet tube 18, which is left open to the air. Coupling brackets 19 support the U-tube on the stand 12. In addition, a sponge rubber pad 20 within the stand 12 fits closely around the U-tube maintaining it in position.

On one side of the U-tube a graduated inch measuring scale 21 is slidably splined to the stand. Since the manometer is of the U-tube type, the graduations are marked numerically at one-half inch intervals, thereby allowing the vacuum developed to be read directly in inches of mercury.

Said scale 21 consists of an elongated metal plate 23, having the edges 24 thereof turned backwardly and inwardly to form channels adapted to be slidably mounted upon flange members 25 in such a fashion as to permit longitudinal movement only of the scale, said flange members being attached to the stand 12. A threaded rod 26 is rotatably threaded into the female member 27 on the back of the scale 21. The lower end of the rod has fixedly mounted thereon the thumbscrew 28 which is supported by a pin 29 on the stand 12.

On the other side of the U-tube a motor condition scale 30, adapted to furnish direct readings of the condition of the motor according to the vacuum developed in the intake manifold, is attached to the stand 12. Said motor condition scale consists of an elongated metal plate 31 having thereon colored zones 32 on which are printed various motor conditions such as "normal motor", "leaky manifold", etc.

The edges 33 of said scale are turned backwardly and inwardly to form channels adapted to be slidably mounted upon flange members 34 in such a fashion as to permit longitudinal movement only on the stand 12.

On the upper part of the front of the stand 12 is printed a scale 35 of numbers representing, preferably to the nearest 500 feet, the range of altitude at which the manometer may be used, said numbers being spaced from each other the distance which the height of the mercury column will change with corresponding changes in altitude. A slot 36 is cut in the front of the stand 12, adapted to have an opening 37 in the lower end of the scale register therewith. Through the opening 37 in the lower end of the scale 30 a bolt or screw 38 secures the scale to the stand 12 at any desired level. In the upper part of the scale 30 is a slot 39 so spaced that when the bolt 38 is in the top of the slot 36 the zero point on the scale 35 shows through said slot opposite the pointer. The motor condition scale is calibrated so that, as long as the altitude which is shown through the slot 39 when the device is used corresponds to the true altitude, the words opposite the mercury level describe the condition of the motor. Without such an altitude adjustment the reading would vary with the altitude.

In the illustrated device the outlet tube 15 from the exposed leg of the U-tube is connected to the intake manifold, windshield wiper, or other part of the intake line of the automobile motor, or other internal combustion engine. The second outlet tube 18 is allowed to remain open to the air. The inch scale 21 is raised or lowered by means of the thumbscrew adjustment 28 until the level of the mercury in the U-tube exactly corresponds to the zero mark on the scale. The motor condition scale 30 is adjusted so that the altitude at which the device is being used shows through the slot 39. When the motor is operated, the height of the mercury column as measured on the inch scale 21 shows directly the vacuum which is developed and the reading on the motor condition scale 30 shows directly and accurately the condition of the motor.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. A manometer for measuring the vacuum developed in the intake manifold of an internal combustion engine to indicate the condition of said engine, including: a stand; a U-tube in said stand having an exposed vertical leg adapted to be connected to said manifold and to have a liquid rise therein in accordance with said vacuum; a scale adjacent said tube graduated in zones indicating motor condition, said scale being slidably splined on said stand adjacent said leg for vertical movement and having a slot therethrough; and a second scale on said stand graduated in altitude readings and adapted to have one of said graduations exposed by said slot, whereby vertical adjustment of said first mentioned scale until the altitude reading exposed by said slot corresponds to the altitude at which the manometer is used enables the true condition of said engine to be read directly from the zone adjacent the top of the liquid in said leg.

2. A manometer for measuring the vacuum developed in the intake manifold of an internal combustion engine to indicate the condition of said engine, including: a stand having a vertical groove therein; a U-tube in said stand having one leg in said groove and exposed to view, said leg being adapted to be connected to said manifold and to have a liquid rise therein in accordance with said vacuum; a scale adjacent said tube graduated in zones indicating engine condition, said scale being slidably splined on said stand for vertical movement and having a slot therethrough; a second scale on said stand graduated in altitude readings and adapted to have the altitude at which said manometer is used read through said slot when said first mentioned scale is adjusted for variations in altitude to enable a true engine condition to be read directly from the zone adjacent the top of the liquid in said leg; and a third vertically adjustable scale on said stand adjacent said leg, said scale being graduated to indicate the vacuum in said manifold in inches of mercury.

HAROLD W. EDEN.